United States Patent
McNerney

[11] Patent Number: 5,560,511
[45] Date of Patent: Oct. 1, 1996

[54] HERMETICALLY SEALABLE REUSABLE CONTAINER

[75] Inventor: John L. McNerney, Abingdon, Md.

[73] Assignee: The United States of America as represented by the Secretary of the Army, Washington, D.C.

[21] Appl. No.: 370,587

[22] Filed: Jan. 6, 1995

[51] Int. Cl.$^6$ .............................. B65D 45/00; G21F 5/00
[52] U.S. Cl. ...................................... 220/327; 250/506.1
[58] Field of Search .................................. 220/327, 328, 220/241, 242, 324; 206/524.1, 3; 250/506.1; 376/272

[56] References Cited

U.S. PATENT DOCUMENTS

| | | | |
|---|---|---|---|
| 2,919,048 | 12/1959 | Harvey | 220/327 X |
| 3,770,964 | 11/1973 | Backus | 250/506.1 |
| 3,895,735 | 7/1975 | Clay | 220/324 |
| 3,974,933 | 8/1976 | Toth et al. | 220/327 X |
| 3,982,134 | 9/1976 | Housholder et al. | 250/506.1 |
| 4,445,042 | 4/1984 | Baatz et al. | 250/506.1 |
| 4,447,733 | 5/1984 | Baatz et al. | 250/506.1 |
| 4,465,201 | 8/1984 | Chalfant, Jr. | 220/327 X |
| 4,495,139 | 1/1985 | Janberg et al. | 250/506.1 X |
| 4,566,588 | 1/1986 | Kataczynski | 206/3 |
| 4,747,512 | 5/1988 | Lo | 250/506.1 X |
| 4,894,550 | 1/1990 | Baatz et al. | 250/506.1 |

FOREIGN PATENT DOCUMENTS

| 4004037 | 5/1991 | Germany | 250/506.1 |
|---|---|---|---|

OTHER PUBLICATIONS

Plumber et al, Containers for Leaking Chemical Rounds, Army Reserach, Development & Acquisition Bulletin, Mar. Apr. 1989.

*Primary Examiner*—Bryon P. Gehman
*Attorney, Agent, or Firm*—Saul Elbaum; Edward L. Stolarun

[57] ABSTRACT

A device for housing toxic waste or toxic munitions including a vessel having a body flange and a removable cap that interfaces with the body flange to make a hermetic seal. A primary and a secondary O-ring are positioned between the cap and the body flange to ensure a leak-proof seal having an integrity of $1\times10^{-6}$ He/sec at one atmosphere at standard temperature and pressure (STP).

9 Claims, 1 Drawing Sheet

HERMETICALLY SEALABLE REUSABLE CONTAINER

GOVERNMENT RIGHTS

The invention described herein may be made or used by or for the U.S. Government for governmental purposes without payment of any royalties thereon.

FIELD OF THE INVENTION

This invention relates to a container having a reusable hermetic seal. The container includes polished surfaces, multiple O-rings and removable fasteners for preventing leaks of toxic substances.

BACKGROUND OF THE INVENTION

With the fall of the Iron Curtain and the breakup of the Soviet Union, it has become necessary to remove toxic (chemical material) munitions stored by NATO and the U.S. Government in Germany and elsewhere. These munitions include 155 mm projectiles and an 8-inch projectile designated M426 adapted for delivering chemical weapons. Routine inspections of munitions storage sites have revealed that a small number of stored 155 mm projectiles leak. Propellant charge containers were considered adequate for limited storage at such facilities, but it soon became apparent that such containers would not be adequate to store toxic munitions for longer periods of time and would not withstand the handling necessary to move such munitions.

Single round containers (SRC) were developed to house for transport 155 mm projectiles, 8-inch projectiles, bent projectiles, and projectiles with diameters of 12 inches. Each SRC was designed to enclose a single toxic agent munition and to prevent leakage of any agent material. The body of an SRC was fabricated by welding a flange and a domed elliptical head to a tubular body. A similar flanged head assembly was then attached to the body flange. Between the flanges was provided a butyl rubber O-ring as a barrier for leaking toxic chemical agents. Screw fasteners about the flange body were used for sealing the container.

It was later determined that the agent fill of such munitions included a chemical or chemicals that deteriorate carbon products, and over time and exposure to such chemicals the butyl rubber could break down, thus compromising the integrity of the container seal.

SUMMARY OF THE INVENTION

In order to overcome the problems associated with possible toxic chemical leakage, the applicant has included as part of a container, inter alia, a second seal to protect the butyl rubber seal from agent material components that tend to deteriorate carbon products. In particular the container of the invention is a vessel having a closed bottom end and a top end, with a flange member located at the top end of the vessel. The flange member has a top surface extending beyond the body of the vessel. The container includes a cap having a bottom surface for mating with the top surface of the flange member. The cap and flange are removably bolted to one another. Between the cap surface and the flange surface are two O-rings, a butyl O-ring and a tetrafluoroethylene O-ring. The container maintains a leak-seal integrity of equal to or greater than $1 \times 10^{-6}$ cc He/sec at 1 atmosphere, with either O-ring by itself as well as with both O-rings in place.

DETAILED DESCRIPTION OF THE INVENTION

Figure 1:
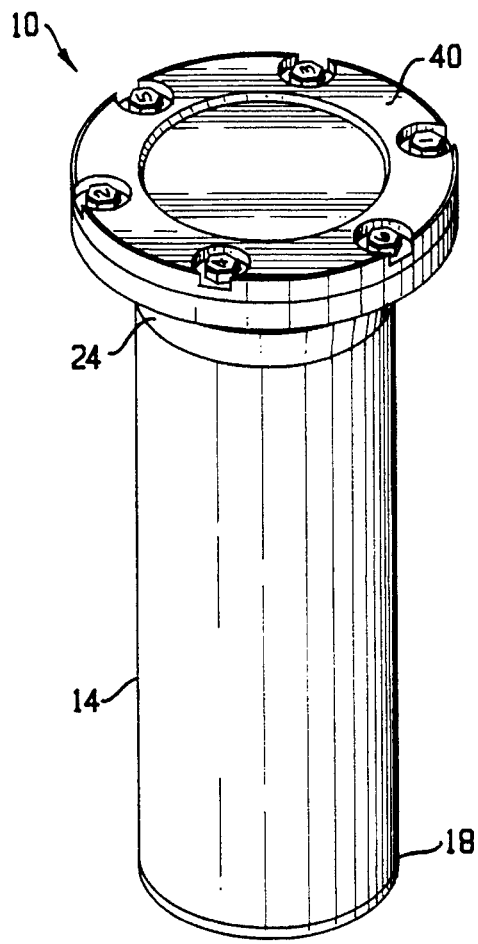
FIG. 1 is a plan view of the container of the invention.
Figure 3:
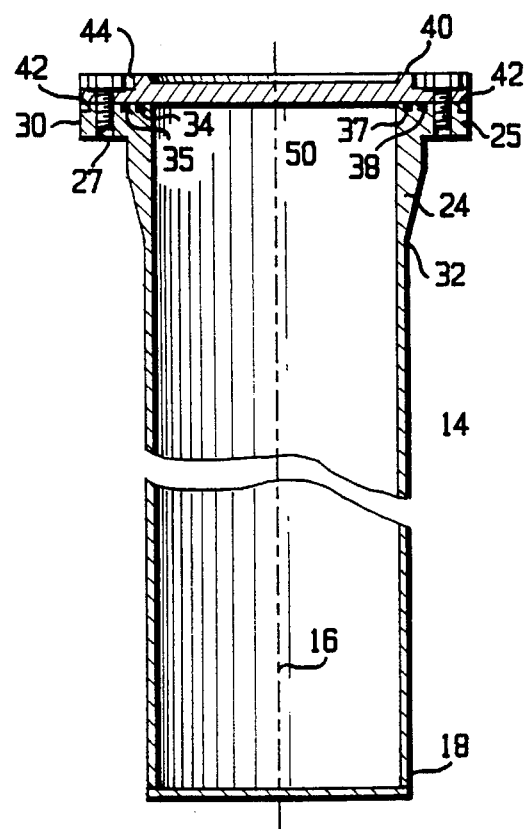
FIG. 3 is a section of the container of the invention taken on line 3—3 of FIG. 2.

The majority of container 10 is preferably made of non-corrosive steel. As shown in FIGS. 1 and 3, the container is made up of a cylindrical vessel 14, which vessel has a longitudinal axis 16, a closed bottom 18, a top end, and an inner and outer diameter. The top end is open providing access to the interior of the container until it is capped.

Fastened integrally to a top section or top end of container 10 is an interfacing closure member in the form of a body flange 24 having a circular interior profile. The body flange 24 is fabricated from material conforming to seamless carbon alloy steel mechanical tubing (HRS—Spec. ASTM A-519). The interior diameter of body flange 24 has an inner diameter equal to or substantially equal to the inner diameter of the container. However, the outer dimensions of the flange are irregular and include an extended planar flange face defining the top portion of the open-ended container and its inner diametrical dimension. The extended flange is of sufficient length that shoulder 25 extends beyond the outer diameter or wall of vessel 14, and shoulder 25 is of sufficient depth to have machined therethrough a plurality of circumferentially spaced apart threaded bolt holes 27. Holes 27 receive, for example, 0.500–200 UNF-28 bolts 29. The bolt holes 27 are equally spaced around the body flange and are located mid-way between a radius drawn from the exterior wall of shoulder 25 to the exterior of butyl O-ring 38, which is more fully discussed below. Flange 24 also includes a cut-out or machined groove 30 on the upper exterior side surface 31 of flange 24 and a sidewall 32 that tapers, as shown, to a dimension substantially equal to the exterior diameter of vessel 14.

The exterior face of body flange 24 has two concentric grooves 34 and 35 sharing longitudinal axis 16. The base of each of grooves 34 and 35 are polished to a 16 RMS finish, and the sides of each of grooves 34 and 35 are polished to a 32 RMS finish. Groove 34 has a radius smaller than the radius of groove 35. Grooves 34 and 35 receive, respectively, a tetrafluoroethylene O-ring 37 and butyl rubber O-ring 38. The butyl rubber is 70 durometer per SAE AMS 3238. Butyl O-ring 38 is not only circumferentially bigger (it preferably has an outer diameter of 7.145") as compared to the circumferential diameter of the smaller tetrafluoroethylene O-ring (which preferably has an outer diameter of 6.512"), it has a greater thickness or gauge (which is preferably 0.241 inches) as compared to the thickness of the tetrafluoroethylene O-ring (which is preferably 0.139 inches). The O-rings are separated, center to center, by a radial length of preferably 0.3165 inches. The O-rings as shown in FIG. 3 are positioned on the top surface of body flange 24 that extends beyond the outer wall of vessel 14.

The container 10 is completed by fastening cap 40 to vessel 14. When cap 40 is bolted to the body flange it completes the hermetic seal of the container. Cap 40 has dimensions and structure that interface and conform to the dimensions and structure of the top surface of body flange 24. That is, the outer diameter of the lower section or bottom section of cap 40 is equal to the outer diameter of top portion or section of body flange 24. A depending tooth 42 is included on the bottom outside surface of the cap. At least two surfaces of the tooth mate, interface, or interlock with groove 30 of body flange 24. The cap includes non-threaded holes 44 that align with threaded bolt holes 27 of body flange 24 when the holes 44 are properly superposed over holes 27. Additionally, the cap includes cuts or grooves 46 machined in the top portion 48 thereof to accommodate hex-heads of bolts 29.

Interior or bottom face 50 of cap 40 interfaces with the top face or exterior face 26 of the body flange. Face 50 has a face (not shown), polished to a 16 RMS finish, that receives both the O-rings 37 and 38 positioned on the upper face of body flange 24.

Figure 2:
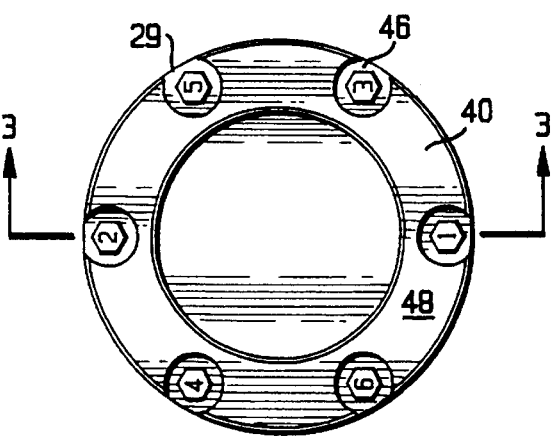
FIG. 2 is a top view of the container of the invention.

The container is sealed by fastening the cap 40 to body flange 24 by tightening down bolts 29. The torque requirement is 60 ft./lbs for each bolt and is applied in increments of 20 ft./lbs. Incremental torquing is applied in numbered sequence, as shown by the numbers on the top of the hex-heads in FIGS. 1 and 2.

The butyl O-ring 38 is molded of a composition that is impervious to liquid chemical compounds as defined in FM3-9. This gasket must be capable of meeting the leak rate criteria of $1 \times 10^{-6}$ cc He/sec at 1 atm, at standard temperature and pressure (STP), when assembled into the O-ring groove 35, without assistance of the TFE O-ring. The butyl O-ring is commercially available from Apple Rubber Products, Inc. 310 Erie Street, Lancaster, N.Y. 14805 as Part No. AS 568-364, Cage Code 62351. A second supplier is Parker Seal Group, 2360 Palumbo Dr., P.O.Box 11751, Lexington, Ky. 40512, as Part No. 2-364 and Cage Code 02697. The TFE O-ring 37 is used as a barrier against liquid contamination of the butyl O-ring 38 by compounds defined in FM3-9. The gasket 37 meets the leak criteria of $1 \times 10^{-6}$ cc He/sec at 1 atm when assembled into groove 34 without assistance from the butyl O-ring. The TFE O-ring 37 is obtained from the same two suppliers, supra, and is sold as Part No. AS 568-259 by Apple Rubber and 2-259 by Parker Seal Group. Cage Codes assigned by these companies to O-ring 37, are 62351 and 02697, respectively.

The container thus sealed is capable of withstanding a rapid (5 second) change in atmospheric pressure from sea level (29.92 inches of Hg) to 50,000 ft (approximately 0.0 inches of Hg) without any change in interior pressure. The container is capable of being contaminated with lethal and incapacitating organophosphate liquid chemical compounds as defined in FM3-9—Potential Military Chemical/Biological Agents and Compounds and decontaminants, and standard decontamination material (i.e., super tropical bleach (STB) and DS2) without deleterious effect to the reuse of the container.

The container is capable of rough handling and is able to maintain its leak-seal integrity of $1 \times 10^{-6}$ cc He/see at 1 atmosphere, at standard temperature and pressure (STP) during such handling.

Having described the subject matter of the present invention, it should be apparent that many substitutions, modifications and variations of the invention are possible in light of the above teachings. It is therefore to be understood that the invention as taught and described herein is only limited by the appended claims.

What is claimed is:

1. A container for storing toxic chemical materials, comprising:

a vessel having a closed bottom and an open end for receiving a chemical material to be stored;

a closure member located at the open end of the vessel and having a closure interfacing surface;

a removable cap for hermetically sealing the open end of the vessel, said cap having an interfacing surface for mating with said closure interfacing surface;

means defining a first groove in one of said interfacing surfaces;

means defining a second groove in said one of said interfacing surfaces spaced apart from said first groove and positioned between said first groove and said vessel;

a primary seal formed from a composition containing tetrafluoroethylene;

a secondary seal formed of butyl rubber;

said secondary seal being interposed between said interfacing surfaces and positioned in said first groove;

said primary seal being interposed between said interfacing surfaces and positioned in said second groove for preventing stored toxic chemical materials from contacting and deteriorating said secondary seal;

and means for sealing the removable cap to the closure member.

2. The container of claim 1 wherein:

said first groove encircles said vessel and said secondary seal is an O-ring seal disposed within said first groove to encircle said vessel.

3. The container of claim 2 wherein:

said second groove encircles said vessel and said primary seal is an O-ring seal disposed within said second groove to encircle said vessel.

4. The container of claim 3 wherein:

said secondary seal has a thickness which is larger than the thickness of said primary seal.

5. The container of claim 4 wherein:

said grooves have interior polished surfaces for achieving a high integrity seal.

6. The container of claim 5 wherein:

each of said grooves have side walls and a base extending the length thereof; and said side walls are polished to about a 32 RMS finish and said base is polished to about a 16 RMS finish.

7. The container of claim 6 wherein:

said closure member includes a planar flange member surrounding said open end;

said first and second grooves are disposed in said flange member;

said flange member includes means defining another groove which surrounds said first and second grooves;

said removable cap includes a tooth depending therefrom which matably interfaces with said another groove; and said means for sealing the removable cap to the closure member includes a plurality of bolts extending through said removable cap and affixed to said flange member in a peripheral array.

8. The container of claim 1 wherein:

each of said grooves have side walls and a base extending the length thereof; and said side walls are polished to about a 32 RMS finish and said base is polished to about a 16 RMS finish.

9. The container of claim 1 wherein:

said closure member includes a planar flange member surrounding said open end;

said first and second grooves are disposed in said flange member;

said flange member includes means defining another groove which surrounds said first and second grooves; and said removable cap includes a tooth depending therefrom which matably interfaces with said another groove.

* * * * *